H. & H. PEARSON.
Tire Tightener.
No. 85,608.    Patented Jan. 5, 1869.
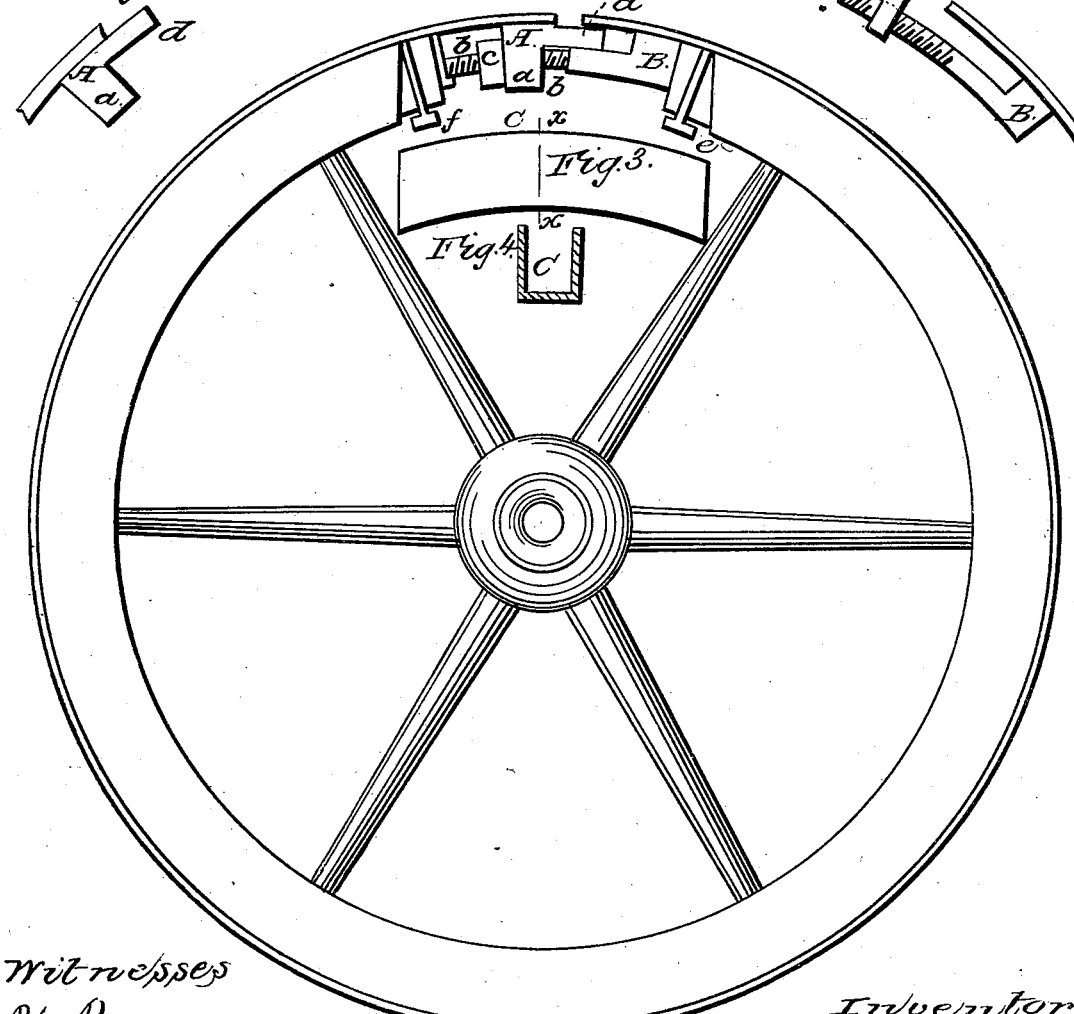

HARRIS PEARSON AND HARVY PEARSON, OF DEPEYSTER, NEW YORK.

Letters Patent No. 85,608, dated January 5, 1869.

DEVICE FOR TIGHTENING TIRES OF CARRIAGE-WHEELS.

The Schedule referred to in these Letters Patent and making part of the same.

*To all whom it may concern:*

Be it known that we, HARRIS PEARSON and HARVY PEARSON, of the town of Depeyster, of the county of St. Lawrence, in the State of New York, have invented a new and useful Device (which we designate "A Tire-Tightener") for Setting, Tightening, and Loosening Tires on Wheels of Wagons, Carts, and Carriages of all descriptions; and we do hereby declare that the following is a full, clear, and exact description of the construction and operation of the same, reference being had to the annexed drawings, making a part of this specification, in which—

Figure 1 is a side elevation of a carriage-wheel, showing our improvements applied thereto, with the metallic box removed;

Figure 2, a section of the wheel, showing the ends of the tires and the metallic box in position;

Figure 3, a side elevation of the box;

Figure 4, a transverse section of the same through the line $x\,x$, fig. 3; and

Figures 5 and 6 are detached views of opposite ends of the tire.

Similar letters of reference indicate corresponding parts in the several figures.

This invention has for its object to facilitate the tightening and loosening of tires upon wheels; and It consists in providing the ends of the tires with right-angular blocks upon the under side, and overlapping each other, one being formed with an opening, for the passage of a screw-bolt upon the other.

The opening formed in the felloes, for the introduction of the projections, is covered by a metallic box, which effectually excludes the dirt, and protects the connections for the ends of the tire from injury.

A represents an angular block, of metal, secured, in any convenient manner, to the end of the tire, upon its inner side.

Through the part $a$ is formed an opening, for the passage of the screw-bolt $b$, formed upon the angular block B, secured to the opposite end of the tire.

The screw-bolt is provided with a nut, $c$, by which the projections are moved, to tighten or loosen the tire.

The arm $d$ of the block A is adapted to fit in the recess formed between the opposite end of the tire and the square shank of the screw-bolt, for the purpose of forming a solid bearing-surface for the end of said tire.

C is a metallic box, slightly curved, to conform to the shape of the felloes, adapted to fit over the blocks A B, and secured in place by the screw-bolts $e\,f$ passing through the tire and felloes, as shown in fig. 1.

The object of this box is to protect the blocks from injury, while it excludes the dirt therefrom, and strengthens the felloes, as the latter, by being cut away for the insertion of the blocks, are somewhat weakened.

It will be readily understood that, by operating the nut $c$, the tires are tightened or loosened with the utmost ease.

Our improvement in operating tires upon wheels combines simplicity, strength, and economy, which are its principal advantages.

Having thus described our invention,

What we claim as new, and desire to secure by Letters Patent, is—

The angular blocks A B, overlapping each other beneath the tire, and supporting the same, adjustable with relation to each other, and adapted to be covered by the curved metallic box B, all constructed, arranged, and operating as herein shown and described.

HARRIS PEARSON.
HARVY PEARSON.

Witnesses:
U. PEARSON,
U. G. PEARSON.